United States Patent [19]

Boyd

[11] 3,953,029

[45] Apr. 27, 1976

[54] BOTTOM LEVELING WATER BALL APPARATUS

[76] Inventor: Charles N. Boyd, 510 S. Broder, Anaheim, Calif. 92804

[22] Filed: Nov. 20, 1974

[21] Appl. No.: 525,570

[52] U.S. Cl. ............................. 273/95 A; 272/1 B; 248/237
[51] Int. Cl.² ....................................... A63B 71/02
[58] Field of Search ........... 273/26 E, 95 A, 95 AA, 273/102 S, 1.5 R, 1.5 A; 272/1 B; 248/148, 357, 237

[56] References Cited
UNITED STATES PATENTS

| | | | |
|---|---|---|---|
| 2,199,461 | 5/1940 | Jones | 273/95 A |
| 2,496,556 | 2/1950 | Nelson | 248/237 |
| 3,087,701 | 4/1963 | Wallace | 273/102 S |
| 3,164,353 | 1/1965 | Rene | 248/237 |
| 3,764,140 | 10/1973 | Lotfy | 273/95 A |

*Primary Examiner*—Richard C. Pinkham
*Assistant Examiner*—Marvin Siskind
*Attorney, Agent, or Firm*—Philip M. Hinderstein

[57] ABSTRACT

Apparatus for use in playing a game in a swimming pool or other body of water having a non-level bottom comprising a base member adapted to be positioned on the bottom of the pool, an elongate pole connected to the base member and extending above the surface of the water, and a ball connected by means of a rope to the upper end of the pole. The length of the pole is adjustable to vary the height of the upper end thereof relative to the surface of the body of water. Furthermore, the angle of the pole relative to the base member is adjustable so that the pole may be positioned vertically regardless of the angle of the base member on the bottom of the swimming pool.

6 Claims, 4 Drawing Figures

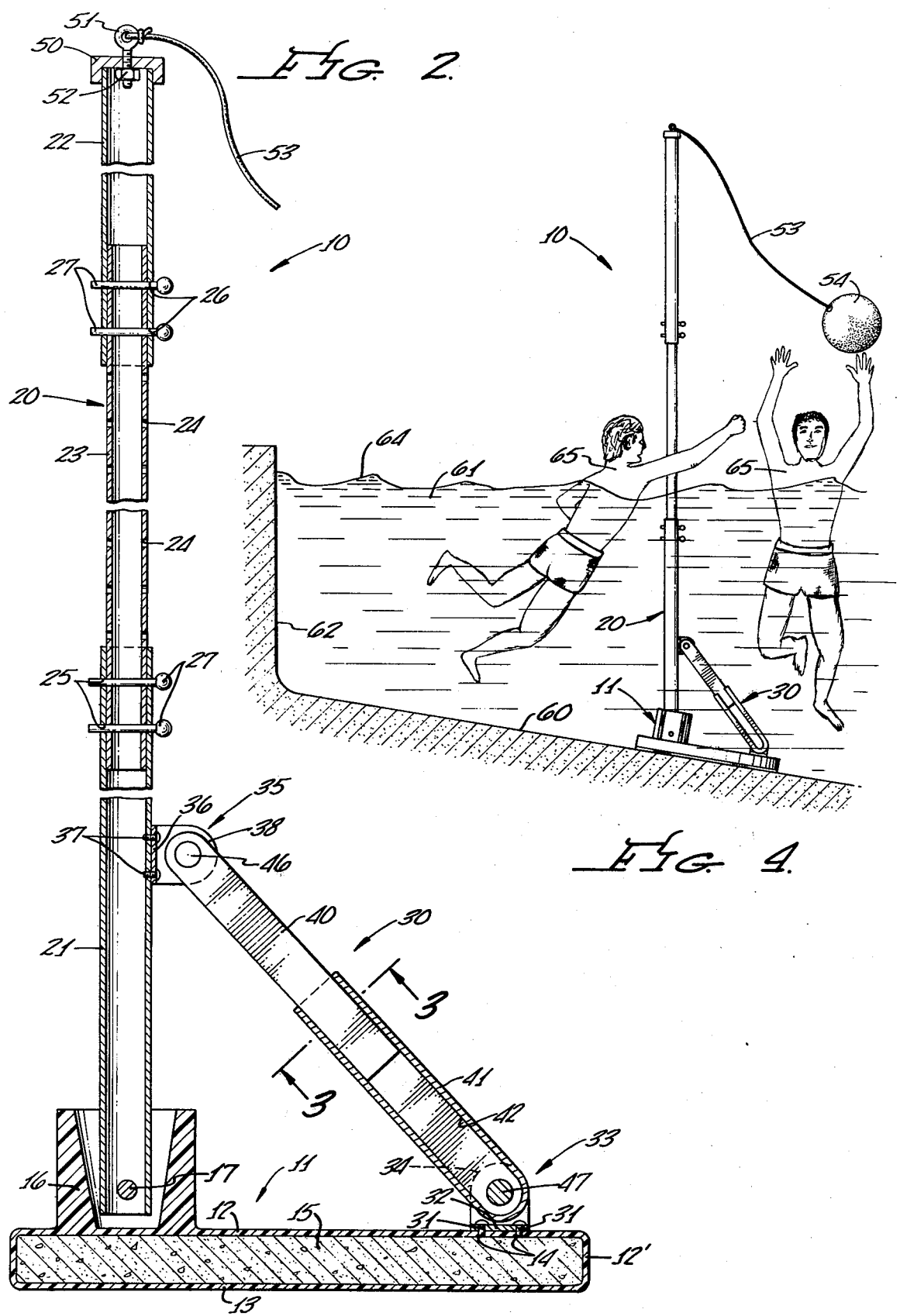

BOTTOM LEVELING WATER BALL APPARATUS

BACKGROUND OF THE INVENTION

1. Field of the Invention

The present invention relates to a water ball game apparatus and, more particularly, to apparatus for use in playing a game in a swimming pool or other body of water having a non-level bottom.

2. Description of the Prior Art

With the ever-increasing popularity of backyard swimming pools as the center of leisure time activities, it has become common to attempt to develop techniques and apparatus whereby otherwise conventional games may be played in the water. Thus, basketball hoops have been mounted on floating bases for use in playing a game similar to basketball. Unfortunately, however, by floating the basketball hoop on the surface of the water, the game of basketball, which uses an elevated hoop, is not accurately simulated.

It is also common to float a pair of poles on the surface of the water and to connect a net between the poles for use in playing a game similar to volleyball. Again, however, the game of volleyball is not accurately simulated because the net floats on the surface of the water and a normal volleyball net is substantially elevated.

Another problem with both of the above types of water ball game apparatus is that their positions do not remain stationary and they float about the pool unless tied adjacent the edge of the pool by a number of ropes. However, such ropes interfere with the normal swimming area.

Water basketball and water volleyball, as described above, are presently the most common games played in a swimming pool. One very popular game among children, presently played on land, is tetherball, requiring a rigid pole and a ball which is connected by a rope to the upper end of the pole. To date, no attempt has been made to convert the playing of such game to a water environment, as is the case with many other popular land based sports.

SUMMARY OF THE INVENTION

According to the present invention, there is provided apparatus for use in playing a water game which solves many of the problems discussed above. With the present apparatus, not only can the game of tetherball be played in the water, but the games of basketball and volleyball, as well as other games, may be played in a manner which more accurately simulates the way the games are played on land. The present apparatus is rigidly fixed relative to the body of water in a manner which does not interfere with the normal swimming area.

Briefly, the present apparatus for use in playing a game in a swimming pool or other body of water having a non-level bottom comprises a base member adapted to be positioned on the bottom of the body of water, an elongate pole, means for pivotably connecting one end of the pole to the base member, an expandable arm operatively connected between the pole and the base member for locking the pole in a desired angular position relative to the base member so that the pole may be positioned vertically regardless of the angle of the base member, and means for adjusting the length of the pole.

With such an apparatus, the pole may be positioned vertically with the upper end thereof spaced at any distance from the surface of the body of water. Accordingly, the pole may be centrally positioned in a pool and a ball connected via a rope to the upper end of the pole for use in playing water tetherball. Alternatively, the apparatus may be positioned at one end of the pool and a basketball backboard and hoop attached to the upper end of the pole for use in playing water basketball. Still further, two poles may be used with a net connected between the upper ends thereof for use in accurately simulating the game of volleyball. Still other uses for the present apparatus will become apparent to those skilled in the art.

OBJECTS

It is therefore an object of the present invention to provide a water ball game apparatus.

It is a further object of the present invention to provide apparatus for use in playing a game in a swimming pool or other body of water having a non-level bottom.

It is a still further object of the present invention to provide a water ball game apparatus which permits the mounting of a basketball hoop, a net, or a tetherball apparatus in a position spaced above the surface of a body of water.

It is another object of the present invention to provide a water ball game apparatus which does not interfere with the normal swimming area of a body of water.

It is still another object of the present invention to provide apparatus for playing the game of tetherball in a swimming pool or other body of water.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 2 is an enlarged sectional view taken along the line 2—2 in FIG. 1;

FIG. 4 is a diagramatic view showing the apparatus of FIGS. 1–3 in use.

DESCRIPTION OF THE PREFERRED EMBODIMENT

Figures 1, 3:
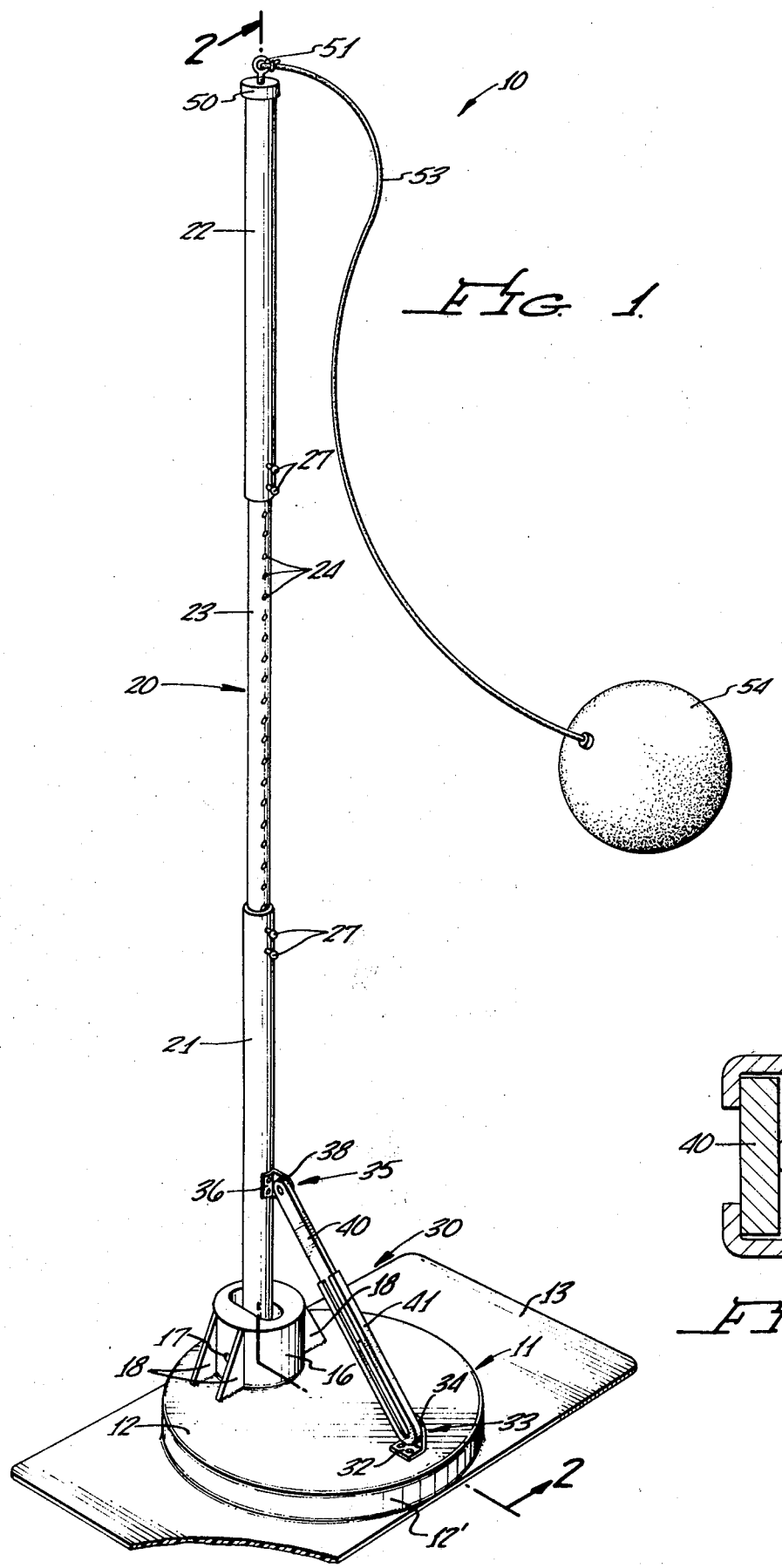
FIG. 1 is a perspective view of a preferred embodiment of water ball game apparatus constructed in accordance with the teachings of the present invention.
FIG. 3 is an enlarged sectional view taken along the line 3—3 in FIG. 2.

Referring now to the drawings and, more particularly, to FIGS. 1–3 thereof, the present water ball game apparatus, generally designated 10, will be described in its use as a water tetherball apparatus. However, and as will be described more fully hereinafter, it will be apparent to those skilled in the art how apparatus 10 may be used for playing other water games.

Apparatus 10 comprises a base member 11 which is adapted to be positioned on the bottom of a body of water at whatever angle such bottom may have. Since base member 11 must rigidly support the remainder of apparatus 10, it must be designed so as to resist movement thereof. One method of achieving this is to form base member 11 into a generally planar, hollow, generally disc-shaped member having a circular upper surface 12, a circular perimeter 12', and an enlarged, rectangular lower surface 13, lower surface 13 being adapted to rest on the bottom of the body of water. According to one embodiment of the invention, base member 11 is filled with concrete 15 or any other dense, heavy material, such as through holes 14, to be described hereinafter, or through any other hole or holes in surfaces 12 or 13 which may or may not be plugged after base member 11 is filled with concrete 15. Alternatively, surface 12 may be provided with a plurality of open holes to permit base member 11 to fill with water as it is submerged so as to eliminate the necessity for concrete 15.

Preferably made integral with upper surface 12 of base member 11 is a generally cup-shaped support member 16 which extends perpendicular to surface 12 and is braced with respect thereto by a plurality of reinforcing ribs 18. Support member 16 receives one end of an elongate pole, generally designated 20. A pin 17 extends across support member 16 and through said one end of pole 20 so that pole 20 is pivotably supported for limited angular movement about an axis of rotation defined by pin 17. Furthermore, in order to permit pivotal movement of pole 20, the inner diameter of support member 16, in the direction of movement of pole 20, is greater than the outer diameter of pole 20. Furthermore, the inner wall of support member 16 may be tapered, as shown.

In order to lock pole 20 in a desired angular position relative to base member 11, apparatus 10 comprises an expandable arm, generally designated 30, one end of arm 30 being connected to upper surface 12 of base member 11 and the other end of arm 30 being connected to pole 20, spaced from pin 17. More specifically, support member 16 is positioned adjacent one edge of upper surface 12 of base member 11 with pin 17 perpendicular to a plane passing through pole 20 and bisecting base member 11. Also positioned on such plane, adjacent an opposite edge of upper surface 12 of base member 11, is a pair of bolts 31 which extend through one leg 32 of an L-shaped bracket 33 and into holes 14 which are internally threaded for receiving bolts 31. Bracket 33 includes a second leg 34 which extends perpendicular to surface 12 of base member 11 and parallel to the plane referred to previously which bisects base member 11. A similar L-shaped bracket 35 has one leg 36 connected to pole 20, by bolts 37, at a point spaced above pin 17, bracket 35 including a second leg 38 which extends perpendicular to pole 20, parallel to and approximately coplanar with leg 34 of bracket 33.

Expandable arm 30 includes first and second relatively moveable arm members 40 and 41 and means 45 for releasably interlocking arm members 40 and 41. More specifically, arm member 40 is an elongate planar member, one end of which is pivotably connected by means of a pin 46 to leg 38 of bracket 35. Arm member 41 is an elongate member having a generally C-shaped cross-section defining a channel 42 through which arm member 40 may freely move axially but which limits the lateral and rotational movement of arm member 40. One end of arm member 41 is pivotably connected by means of a pin 47 to leg 34 of bracket 33, the other end of arm member 40 extending into the other end of arm member 41. Thus, it will be apparent to those skilled in the art that by moving arm member 40 into and out of arm member 41, pole 20 is caused to rotate about pin 17 to assume any angular orientation relative to base member 11, the position of pole 20 only being limited by the length of arm members 40 and 41 and the angle of movement permitted by support member 16.

Means 45 for releasably interlocking arm members 40 and 41 may simply comprise a wing nut 43 extending through a threaded hole 44 in the end of arm member 41. Thus, and as shown in FIG. 3, by tightening wing nut 43, arm member 40 is forced against arm member 41, interlocking the two members and preventing their relative axial movement.

In order to adjust the spacing between the upper end of pole 20 and the surface of a body of water, pole 20 is made adjustable in length. This may be achieved by providing pole 20 in multiple telescoping sections, such as a lower section 21, an upper section 22, and a middle section 23. Each of pole sections 21–23 may be an elongate hollow member, sections 21 and 22 having the same diameter and section 23 having a smaller diameter so as to fit inside of sections 21 and 22. Section 23 may also be provided with a plurality of spaced holes 24 and the upper and lower ends of sections 21 and 22, respectively, may be provided with spaced holes 25 and 26, respectively, the spacing between holes 25 and 26 being the same as the spacing between adjacent holes 24. Furthermore, apparatus 10 may include a plurality of pins 27. Therefore, by extending a first set of pins 27 through holes 25 in pole section 21 and one set of holes 24 in pole section 23 and by extending a second set of pins 27 through holes 26 in pole section 22 and a second set of holes 24 in pole section 23, the relative positions of pole sections 21–23 may be adjusted to vary the length of pole 20.

According to the embodiment of the invention shown in FIGS. 1 and 2, apparatus 10 includes a cap 50 which is connected to the upper end of pole section 22. Cap 50 supports an eyebolt 51 and a nut 52, eyebolt 51 permitting connection to the upper end of pole 20 of one end of a rope 53, the other end of which is connected by conventional means to a conventional tetherball 54.

OPERATION

In operation, and with reference to FIGS. 1–4, base member 11 is adapted to be positioned on the bottom 60 of a body of water 61 such as a swimming pool 62. As shown in FIG. 4, base member 11 would be positioned with expandable arm 30 parallel to the direction of slope of surface 60. Thereafter, wing nut 43 would be loosened and pole 20 pivoted around pin 17 until it is vertical. Then, wing nut 43 may be tightened to maintain pole 20 in this position. Base 11 is heavy enough when filled with water, concrete or the like to maintain pole 20 stationary. Furthermore, the weight of the water on upper surface 12 of base member 11 and the resistance that the water provides to movement of pole 20 also help stabilize pole 20. In addition, enlarged rectangular lower surface 13 of base member 11 resists any tendency of base member 11 to tip over and roll.

The length of pole 20 may be adjusted, as described previously, to position cap 50 at any desirable height above surface 64 of body of water 61. With these simple adjustments, apparatus 10 is now in position for use by one or more players 65 to play tetherball in a manner which accurately simulates the manner in which the game is played on land.

While the invention has been described with respect to a preferred physical embodiment constructed in accordance therewith, it will be apparent to those skilled in the art that various modifications and improvements may be made without departing from the scope and spirit of the invention. For example, section 22 of pole 20 may be utilized to support a conventional basketball backboard and hoop so as to position such backboard and hoop above surface 64 of body of water 61 so that players 65 in body of water 61 may play the game of basketball in a manner which accurately simulates the way such game is played on land. Still futher, apparatus 10 may be duplicated and the two poles 20, with little or no modification, utilized to support opposite ends of a net which would be strung across swimming pool 62 so that players 65 may play the game of volleyball in a manner which accurately simulates the way such game is played on land. Other uses for apparatus 10 will be apparent to those skilled in the art. Accordingly, it is to be understood that the invention is not to be limited by the specific illustrative embodiment, but only by the scope of the appended claims:

I claim:

1. Apparatus for use in playing a game in a swimming pool or other body of water having a non-level bottom, comprising:
   a base member adapted to be positioned on said bottom of said body of water, said base member having a cavity on the upper side thereof;
   an elongate pole, one end of said pole extending into said cavity, said cavity being elongated laterally in one direction to permit movement of said one end of said pole in said one direction;
   a pin extending across said cavity perpendicular to said one direction and through said one end of said pole for pivotably supporting said pole about an axis of rotation defined by said pin for permitting limited angular movement of said pole relative to said base member in said one direction;
   adjustable means operatively connected between said pole and said base member for locking said pole in a desired angular position relative to said base member whereby said pole may be positioned vertically, regardless of the angle of said base member;
   means for adjusting the length of said pole; a game device; and
   means for connecting a game device to the other end of said pole.

2. Apparatus according to Claim 1 wherein said one end of said pole is connected ajdacent one edge of said upper side of said base member and wherein said pole locking means comprises:
   an expandable arm, one end of said arm being connected to said upper side of said base member, adjacent an opposite edge thereof, the other end of said arm being connected to said pole, spaced from said one end thereof.

3. Apparatus according to claim 2 wherein said expandable arm comprises:
   first and second relatively moveable arm members, one end of said first arm member being connected to said pole, one end of second arm member being connected to said base member; and
   means for releasably interlocking said first and second arm members.

4. Apparatus according to claim 1 wherein said base member is a generally planar member having a lower surface adapted to be positioned on said bottom of said body of water and an upper surface and further comprising:
   a generally cup-shaped support member connected to said upper surface of said base member, said support member defining said cavity, the inner diameter of said support member being greater than the outer diameter of said pole in said one direction, said one end of said pole extending into said cup-shaped support member;
   said pin extending across said cup-shaped support member and through said one end of said pole.

5. Apparatus according to claim 1 wherein said game device is a ball and said means for connecting a game device to the other end of said pole comprises:
   a rope connected between said pole and said ball.

6. Apparatus according to claim 1 wherein said pole includes a plurality of telescoping sections.

* * * * *